United States Patent [19]

Hostetler

[11] Patent Number: 5,284,110
[45] Date of Patent: Feb. 8, 1994

[54] BRACKET CONNECTOR FOR A WATER SUPPLY SYSTEM

[75] Inventor: Robert D. Hostetler, Elkhart, Ind.

[73] Assignee: Avtron, Inc., Elkhart, Ind.

[21] Appl. No.: 871,975

[22] Filed: Apr. 22, 1992

Related U.S. Application Data

[63] Continuation-in-part of Ser. No. 747,863, Aug. 20, 1991, abandoned.

[51] Int. Cl.$^5$ .......................................... A01K 39/02
[52] U.S. Cl. ........................................ 119/72; 251/146
[58] Field of Search ....................... 119/72, 72.5, 75; 248/68.1, 62, 59; 251/145, 146; 137/883

[56] References Cited

U.S. PATENT DOCUMENTS

| | | | |
|---|---|---|---|
| 824,544 | 6/1906 | Hossege. | |
| 4,267,800 | 5/1981 | Keller | 119/72 |
| 4,284,036 | 8/1981 | Hostetler | 119/72.5 |
| 4,491,088 | 1/1985 | Hostetler | 119/72.5 |
| 4,589,373 | 5/1986 | Hostetler | 119/72.5 |
| 4,637,345 | 1/1987 | Hostetler | 119/72.5 |
| 4,669,422 | 6/1987 | Steudler | 119/72 |
| 4,724,797 | 2/1988 | Steudler | 119/72 |
| 4,753,196 | 6/1988 | Lack | 119/72 |
| 4,794,881 | 1/1989 | Rader | 119/72.5 |
| 4,884,528 | 12/1989 | Steudler | 119/72.5 |
| 4,892,061 | 1/1990 | Steudler | 119/75 |
| 4,982,699 | 1/1991 | Momont | 119/72.5 |
| 5,048,462 | 9/1991 | Hostetler | 119/72 |

OTHER PUBLICATIONS

Patent Application Serial No. 07/747,599; filed Aug. 21, 1991, Connector for a Watering System.

*Primary Examiner*—Gene Mancene
*Assistant Examiner*—Thomas Price
*Attorney, Agent, or Firm*—Baker & Daniels

[57] ABSTRACT

The present invention is a bracket connector for a water supply system having a ballast pipe supporting a conduit with a plurality of dispenser valves. The three piece bracket connector includes a bottom or saddle receiving portion attached on the conduit and keyed to a vertical wall of the conduit saddle, a middle or ballast receiving portion having arms for receiving and holding the ballast pipe, and a top portion for fitting between the arms whereby the three portions form a bracket connector body having a substantially continuous external surface for minimizing the accumulation of particulate. By keying the saddle receiving portion on the wall of the conduit saddle, the dispenser valves are maintained in a perpendicular alignment with the ground. The bottom and middle portions are interconnected by a tongue and slot arrangement which extends across substantially all of the width of the bracket connector, thus distributing the weight of the conduit across the tongue and slot interconnection. Also, a nub of the middle portion clicks into a recess of the bottom portion and latches the tongue in the slot. The single piece bracket connector includes two arms which flex outwardly to receive the ballast pipe and water conduit. Fingers at the lower ends of the arms are keyed to the wall of the saddle portion and thereby align the bracket connector vertically with the saddles and the ground.

25 Claims, 3 Drawing Sheets

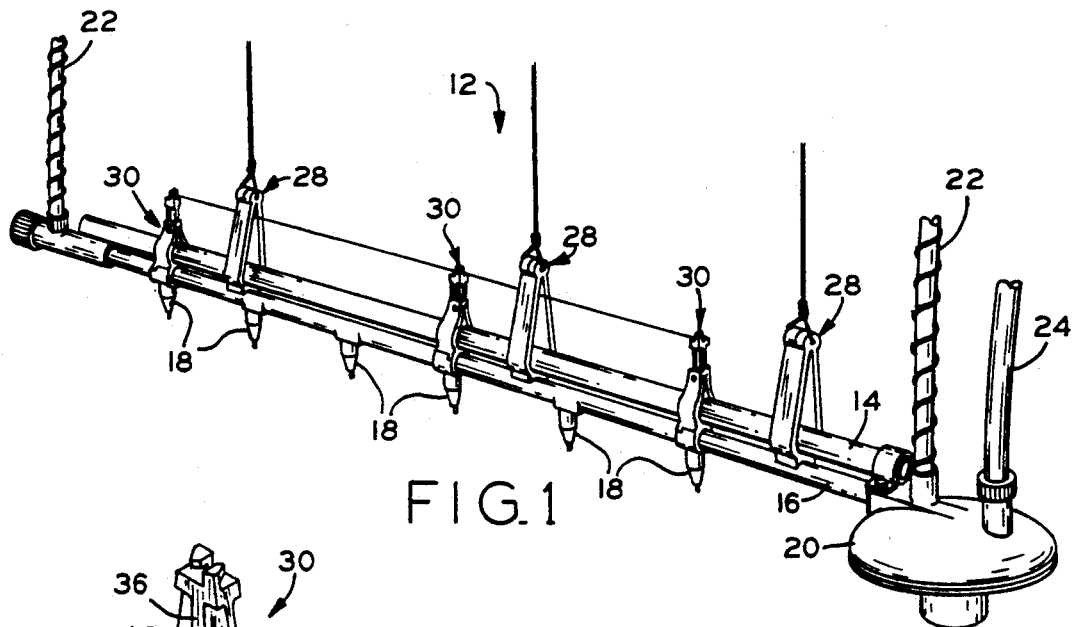
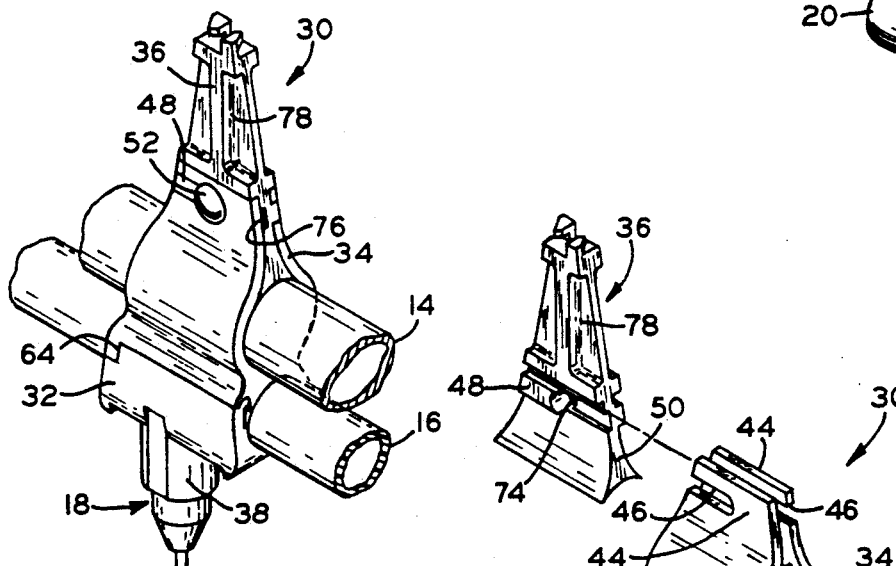
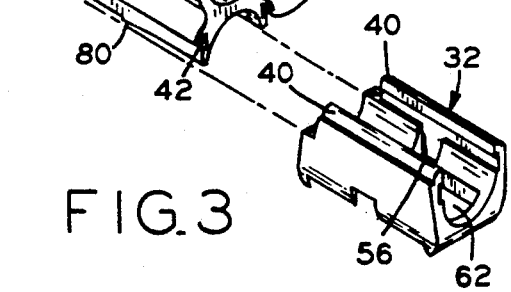

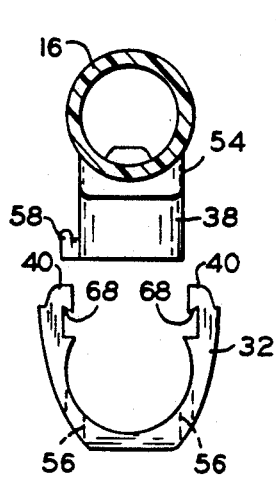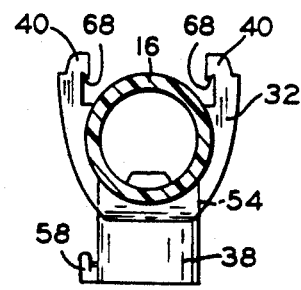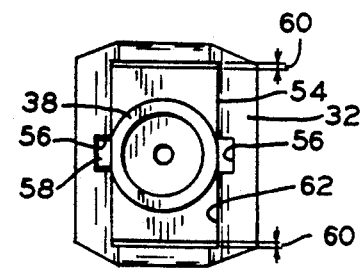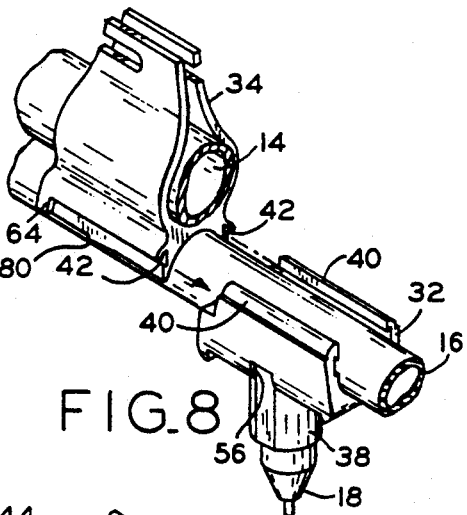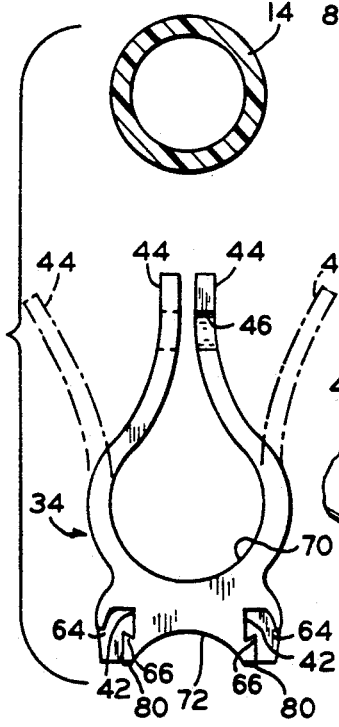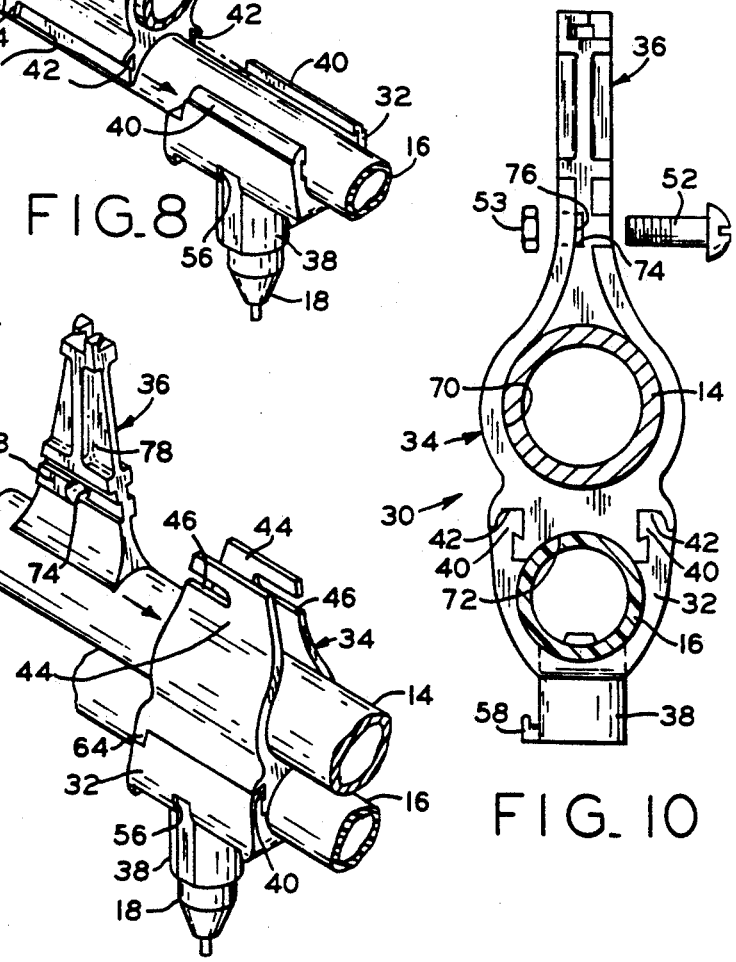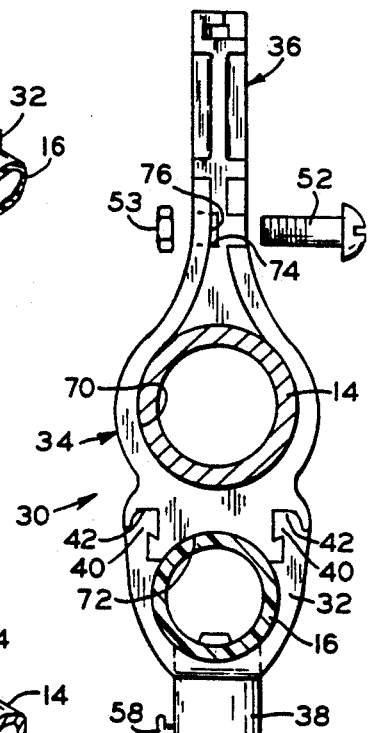

BRACKET CONNECTOR FOR A WATER SUPPLY SYSTEM

CROSS-REFERENCE TO RELATED APPLICATIONS

This is a continuation-in-part of copending U.S. Pat. application Ser. No. 07/747,863, filed Aug. 20, 1991, now abandoned, entitled "CONNECTOR FOR A WATERING SYSTEM".

BACKGROUND OF THE INVENTION

1. Field of the Invention

The present invention relates to water supply systems for small animals and the like. Specifically, the field of the invention is that of devices for connecting conduit and ballast portions of such a water supply system.

2. Description of the Related Art

The proper provision of water is essential for safe and efficient nurturing of fowl and small animals, for example in raising chickens. The proper amount of water is critical to develop the chickens quickly for consumption, and is at least as important as food. Water is important in terms of cost because chickens receiving more water consume less food. In addition to the chickens needing water to grow, water may provide other benefits, for example, medicine and vitamins may be added to provide the chickens beneficial nutrients. However, problems with the water supply may adversely affect the chickens. Leakage in the water supply system may foster bacteria growth and infection, and left unchecked may flood the hen house and drown the chickens. Therefore, water accumulating on the floors of the hen house should be avoided. If too much water is dispensed each time the valve opens, then the excess water may wet the chicken and wet the litter which fosters bacteria and mold and thereby endangers the health of the chickens.

A water supply system described in U.S. Pat. Nos. 4,284,036, 4,491,088, 4,589,373, and 4,637,345 solves many of the aforementioned problems, and each of these patents is expressly incorporated by reference herein. These patents describe a valve for providing water to chickens and the like while minimizing the leakage of water. The valve disclosed in the aforementioned patents has a tubular body with a tapered lower bore which is sealed by a pin having a head resting on a rubber cup on the inside lower surface of the valve. A metal ball sets on the head, and a three ring seal is formed by the head abutting the cup and the ball abutting two seats of the cup. The ball may be unseated by tilting the pin and moving it out of axial alignment with the body, so that the head rests only on a small portion of the cup, and the ball is raised to move it out of engagement with the other seats. Only a small amount of water is able to flow through the restricted gaps between the ball and the cup when the pin is tilted, and the water droplet so formed flows along the pin to its bottom. The pin is a shiny metallic element which attracts the attention of chickens. Normally, a chicken moves the pin with its beak, and the valve allows a small water droplet to pass so that the chicken may easily consume the droplet as it flows down the pin.

The valve is mounted on the underside of the water supply system conduit at predetermined positions. A lateral projection of the valve body includes a shank with a hook for attaching over a part of an integral valve seating portion of the conduit. In order to operate properly, the valve should be positioned relatively perpendicularly with respect to the ground. More specifically, when the pin head is seated on the cup, the axis of the pin should be perpendicular with the ground. This arrangement results in the force of gravity uniformly pressing the head of the pin onto the rubber cup to form one of the three seals, and when the head is so disposed then the ball is also in contact with the other two sealing positions.

The conduit is attached to the underside of a ballast pipe by a wrap connector. The wrap connector is made of the same material as the conduit, e.g. plastic or ABS material which is food grade material, and is sonically welded to the conduit. The ballast pipe may be a rigid elongate element, such as a galvanized steel pipe. The wrap connector is bolted to the ballast pipe and thus holds the conduit in spaced relation below. Fingers at the top of the wrap connector are used to hold an electrically conductive cable which serves as an anti-roosting device. The wrap connector includes two initially separate upper and lower portions. The lower portion has a hook on one side for locking with a slot of the upper portion. A bolt extends through each portion on the opposite side of the slot and hook, and is threadably engaged by a nut to couple the upper and lower portions together. A more detailed description of the wrap connector, as well as a hanger system to suspend the water supply system, is disclosed in U.S. Pat. No. 5,048,462, entitled "HANGER FOR WATER SUPPLY SYSTEM AND METHOD OF INSTALLATION", filed Dec. 14, 1989, Ser. No. 07/429,226, assigned to the assignee of the present invention, the disclosure of which is explicitly incorporated by reference.

The above described water supply system may be suspended from the ceiling of a chicken house. When suspended, the hinge portion of the wrap connector, near the hook and slot, receives stress from the load of the conduit which is filled with water. The structural integrity of the wrap connector securely absorbs the stress, and assuming that the lower portions of the wrap connector are properly connected to the conduit, the valves are maintained in a perpendicular position. Thus the system provides water to chickens quite well, minimizing water spillage or buildup.

To further combat the chance of infection or contamination, these systems may be periodically cleaned by use of harsh disinfectants such as quaternary ammonia or iodine. However, cleaning with such a disinfectant may damage stressed portions of the wrap connector, for example at the hinges of the wrap connector where only a limited portion of plastic holds the upper and lower portions together. The hook and slot arrangement which joins the upper and lower portions at one side allows only a fraction of the width of each portion to support the jointure. The disinfectant may weaken the structural integrity of the limited portions of the wrap connector body near the hook and slot and eventually may cause breakage. Thus, periodic cleaning of a structurally secure water supply system with harsh disinfectants may weaken the structural integrity of the plastic wrap connector at the portions which receive stress.

Another difficulty with prior art wrap connectors is that the exterior surface of the wrap connector has dips, crevices, holes, and other structures which allow particulate to accumulate and are difficult to clean out. These structures are difficult to clean because they require spraying of cleansing water at various angles to reach every dip and crevice.

The prior art wrap connectors may also present problems with manufacture and delivery of the system. In manufacture, the prior art wrap connectors often include irregular shapes which are difficult to fabricate, and many wrap connectors are made from relatively expensive materials. In assembling the wrap connector to the conduit, the bottom portion must be carefully aligned with the valve seating portions of the conduit before sonically welding to ensure that the wrap connector properly aligns the valve with the ballast pipe. Regarding storage, the prior art wrap connectors require about twice the storage space for shipment than the conduit itself because of the sonically welded lower portions of the wrap connector which extend from the conduit.

Further difficulty with prior art wrap connectors involves how the prior art systems respond to sudden temperature variation, for example by steam cleaning the system. When the steam is forced through the conduit, the plastic of the conduit rises in temperature much more than the metal ballast pipe, and the plastic material has a higher expansion coefficient than the metal. This results in the plastic conduit expanding much more than the metal during the steam cleaning. The expansion and subsequent contraction of the plastic material may cause breakdown of the plastic conduit. After the expansion and contraction caused by the sudden temperature variation, the plastic conduit may not return to its original shape but rather may assume a less structurally sound shape.

What is needed is a connector for water supply systems which better withstands treatment by harsh disinfectants.

Also needed is a connector which allows less particulate accumulation and is easier to clean.

A further need exists for a connector which facilitates manufacture and storage.

An additional need exists for a connector which allows for expansion and contraction of the conduit in response to sudden temperature variation.

SUMMARY OF THE INVENTION

The present invention is a bracket connecting device for water supply systems, the bracket connector including interfitting portions that attach the ballast pipe and conduit together and perpendicularly align the dispenser valves of the conduit.

The bottom portion of the bracket connector is disposed over a saddle portion of the conduit which further includes a drinker valve extension portion. The bracket connector bottom portion is keyed to the outer surface of the saddle which properly orients the valve in relation to the bracket connector so that the dispenser valve is maintained in a perpendicular orientation to the ground. Thus, the bottom portion grips the saddle portion which serves as a reference for perpendicularly orienting the valves.

Also, the bottom portion may be made out of a material which is more resistant to harsh chemicals than the food grade material of the conduit because it is secured around the conduit and does not have to be sonically welded to fixedly hold the conduit. In a three piece embodiment, the bottom portion easily snaps over and grips the saddle, then interfits with the middle portion to hold the conduit. In the single piece embodiment, the bracket connector arms are separated and the conduit is inserted and secured within the arms, with the fingers of the bracket connector arms gripping the saddle.

In the three piece embodiment, the middle portion slidingly engages the bottom portion, defining slots along substantially all of its width which receive tongues of the bottom portion. Nubs of the middle portion may extend into recesses of the bottom portion to latch together the bottom and middle portions. Also, arms of the middle portion are designed to separate and engage the ballast pipe. The top portion interfits with the upper arms of the middle portion and includes an aperture through which a nut and bolt may extend to fasten together the top and middle portions. After fastening together the top and middle portions, the bracket connector has a substantially smooth and uniform outer surface on which almost no particulate accumulation occurs.

In the single piece embodiment, the lower fingers of the bracket connector arms engage the saddle portion of the conduit. Also, the arms are designed to separate and engage the ballast pipe previous to the arms receiving the conduit and the fingers engaging the saddle. The arms are then secured together, for example by an aperture through which a nut and bolt may extend. The exterior of the arms has a substantially smooth and uniform outer surface on which almost no particulate accumulation occurs.

Another advantage of the bracket connector is that the structure of the bracket connector may be formed by injection molding. Also, the bracket connector may be fabricated from a material different than the conduit because the bottom portion mechanically engages the saddle and conduit. This allows the bracket connector to be made efficiently from a plastic material having a greater chemical resistance than the food grade material of the conduit.

Also, the aperture of the bracket connector bottom portion includes a gap which allows for some play in the attachment so that the conduit may expand and contract without any significant damage. Also, the tongue and slot arrangement of the three piece embodiment further includes stop portions which limit the movement of the tongues. By alternating the orientation of the stop portions across the conduit, any loosening of the tongue and slot connection caused by expansion or contraction of the conduit is minimized.

By using the bracket connector of the present invention, the conduits do not require wrap connectors formed integrally with the conduit which tend to occupy more space and thus increase shipping costs. Without the wrap connector bottom portions being sonically welded to the conduit, about twice the number of conduit sections may be shipped in the same amount of space. To install a system with the three piece embodiment, the bottom portion is slid onto the conduit over the saddle, the middle portion is slid into engagement with the bottom portion, the arms of the middle portion are opened to receive the ballast pipe, and the top portion is interfit with the arms which are then bolted together. The one piece embodiment further reduces the number of parts, thus minimizing inventory and simplifying delivery. To install a system with the one piece embodiment, the ballast pipe is pushed through the arms of the bracket connector, the lower fingers are positioned about the saddle portion of the conduit, and the arms are secured together. Thus, the present invention provides a bracket connector which is easily shipped independently of the conduit sections and which does not require any complicated tools to install.

The present invention, in one form, is a suspended water supply system for chickens and small animals including a conduit, dispenser valves, a ballast, and a connector. The conduit is for transmitting water and includes a plurality of saddle portions. Each saddle portion includes an outer surface having a predetermined orientation relative to the conduit. The dispenser valves selectively dispense water from the conduit, each dispenser valve disposed on one of the saddle portions. The ballast supports the conduit. The connector includes a ballast attachment portion disposed around the ballast and a saddle receiving portion disposed about the conduit and being keyed to the outer surface of the saddle portion. The connector aligns the dispenser valves with the ballast by virtue of the keying on the saddle portion so that when the water supply system is suspended, the dispenser valves are automatically positioned perpendicularly relative to the ground.

One object of the present invention is to provide a connector for water supply systems which better withstands treatment by harsh disinfectants.

Also an object is to provide such a connector which allows less particulate accumulation and is easier to clean.

A further object is to provide such a connector which facilitates manufacture and storage.

An additional object is to provide such a connector which allows for expansion and contraction of the conduit in response to sudden temperature variation.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a perspective view of the chicken water supply system having the bracket connectors of the present invention.

FIG. 2 is an enlarged view, in partial cut-away, of one bracket connector and portions of the ballast pipe and water conduit of the water supply system.

FIG. 3 is an exploded view of the three portions of the bracket connector.

FIG. 4 is a sectional view of the conduit and bottom portion of the bracket connector previous to attachment.

FIG. 5 is a sectional view of the conduit and bottom portion of the bracket connector after attachment.

FIG. 6 is bottom view of the conduit and bottom portion of the bracket connector after attachment.

FIG. 7 is a sectional view of the ballast pipe and middle portion of the bracket connector previous to attachment.

FIG. 8 is a perspective view, in partial cut-away, of the bottom and middle portions of the bracket connector previous to interfitting on the ballast pipe and conduit of the water supply system.

FIG. 9 is a perspective view, in partial cut-away, of the interfitted bottom and middle portions of the bracket connector, on the ballast pipe and conduit of the water supply system, and the top portion of the bracket connector.

FIG. 10 is a sectional view of the bracket connector attached to the ballast pipe and conduit of the water supply system.

Figure 11:
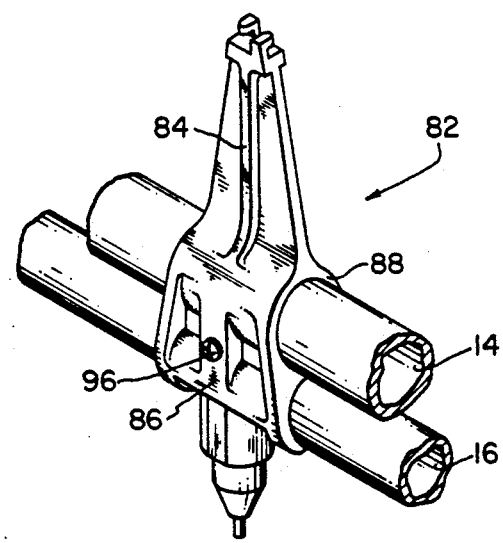
FIG. 11 is an enlarged, perspective view of a second embodiment of the present invention connecting portions of the ballast pipe and water conduit of the water supply system.

Corresponding reference characters indicate corresponding parts throughout the several views. The exemplifications set out herein illustrates preferred embodiments of the invention, in several forms, and such exemplifications are not to be construed as limiting the scope of the invention in any manner.

DESCRIPTION OF THE PREFERRED EMBODIMENT

The present invention relates to water supply systems for fowl and small animals, such as chickens. FIG. 1 shows chicken water supply system 12 generally including ballast pipe 14, conduit 16 having a plurality of drinker or dispenser valves 18, regulator 20, pressure gauges 22, input line 24, hangers 28, and bracket connecting devices 30. Regulator 20 is connected to one end of conduit 16 and receives water from input line 24. Regulator 20 supplies low pressure water through conduit 16 so that chickens may activate dispenser valves 18 and receive water. Ballast pipe 14 supports conduit 16, with hangers 28 suspending ballast pipe 14 and bracket connectors 30 joining ballast pipe 14 and conduit 16. Bracket connectors 30 clasp both ballast pipe 14 and conduit 16, and may be of a form of grappling device or cincture.

In accordance with a first embodiment of the present invention, bracket connector 30 includes bottom portion 32, middle portion 34, and top portion 36 which interconnect to secure together ballast pipe 14 and conduit 16. Bottom portion 32 extends over and around conduit 16 and engages saddle portion 38 of conduit 16. Saddle portion 38 includes a generally rectangular extension from conduit 16, and a cylindrical wall for receiving dispenser valve 18. Tongues 40 extend from the top of each side of bottom portion 32 and engage slots 42 located at the lower end of middle portion 34. Middle portion 34 receives ballast pipe 14 within arms 44. Channels 46 are located near the upper end of arms 44 and are shaped to receive complementary protrusions 48 of base 50 of top portion 36. Base 50 is shaped to fit within the space bounded within arms 44 extending above ballast pipe 14. Bolt 52 engage nut 53 to fasten together arms 44 and to fix top portion 34 between arms 44 and above ballast pipe 14.

As shown in FIGS. 4-6, bottom portion 32 is keyed to the outer surface of vertical walls 54 of saddle portion 38. Vertical walls 54 have a predetermined orientation relative to conduit 16 and serve as a reference point for properly orienting valves 18. Also, bottom portion 32 includes recesses 56 located at each side to accommodate the extension of j-hook 58 of saddle portion 38 when bottom portion 32 is placed over saddle portion 38 and conduit 16. FIG. 6 particularly shows a small gap 60 in the axial direction between the lengths of saddle portion 38 and aperture 62 of bottom portion 32 for allowing expansion and contraction of conduit 16 in the axial direction. Without gap 60, the fixed connection of ballast pipe 14 with bracket connector 30 may cause conduit 14 to bend and buckle in response to sudden temperature changes.

Bottom portion 32 and middle portion 34 are joined by engaging tongues 40 of bottom portion 32 with slots 42 of middle portion 34. Tongues 40 extend across substantially all of the width of bottom portion 32, and slots 42 extend across substantially all of the width of middle portion 34 except for relatively small stop portions 64 which obstruct an end of slot 42. The bottom of the front edges of tongues 40 may have a bullet-like shape (not shown) to ease their insertion into slots 42. Slots 42 are partially defined by angled shoulders 66 which provide a positive latching point for pointed flanges 68. With this arrangement, bottom portion 32 and middle portion 34 are interconnected along substantially the entire width where they abut. Also, tongue 40 completely fills slot 42 with flange 68 latching over shoulder 66 to secure the jointure.

In addition, nubs 80 project from the lower surface of middle portion 34 and keep middle portion 34 from slipping out of slots 42 by extending into recesses 56 when tongue 40 is positioned in slot 42 to thereby join bottom portion 32 and middle portion 34. Nubs 80 have a slight friction fit with bottom portion 32 when tongues 40 are initially slid into slots 42. When nubs 80 are positioned adjacent to recesses 56, they click and latch by extending into recesses 56 thus preventing tongues 40 from sliding out of slots 42.

An advantageous feature of the first embodiment of the present invention involves the jointure of tongue 40 and slot 42. By this arrangement, stress from the weight of conduit 16 is distributed along almost the entire axial width of bottom and middle portions 32 and 34, rather than at more limited points as the hook and slot arrangement of the prior art wrap connectors. The width of bracket connector 30 gradually decreases from middle portion 34 up to top portion 36, with bottom portion 32 having a width slightly wider than the rectangular length of saddle portion 38 and having tongues 40 extending up from bottom portion 32 substantially the entire width. Thus, the weight of conduit 16, which is quite substantial considering the water contained inside, is supported by bottom portion 34 which is connected ballast pipe 14 by a tongue and slot interfitting which extends across substantially the entire width of bracket connector 30.

FIG. 7 illustrates middle portion 34 receiving ballast pipe 14 within arms 44. As shown in dotted lines, arms 44 may be spread apart to allow ballast pipe 14 to be inserted into pipe cavity 70. One method of assembling bracket connector 30 is to insert ballast pipe 14 into middle portion 34 after middle portion 14 has been interfitted with bottom portion 32. A second method involves first inserting ballast pipe 14 into an unattached middle portion 34, then sliding middle portion 34 over ballast pipe 14 (see FIG. 8) and sliding tongues 40 into slots 42 until tongues 40 abut stop portions 64. Lower surface 72 is generally smooth so that middle portion 34 may slide over the exterior of conduit 16. The interior surface of pipe cavity 70 may be smooth to slide over the exterior of ballast pipe 14. Alternatively, the interior surface of pipe cavity 70 may include ribs or other serrations. However, prior to interconnection with top portion 36 and fastening by bolt 52, arms 44 are pliable so that any ribs or other serrations do not inhibit the sliding connection with ballast pipe 14.

Bracket connectors 30 are preferably arranged so that the orientation of stop portions 64 alternate. That is, for every other pair of adjacent bracket connectors 30, stop portions 64 are adjacent (See FIG. 1). This alternating orientation of stop portions 64 helps to maintain the interconnection of all bracket connectors 30 on conduit 16. For example, when conduit 16 is heated during steam cleaning, conduit 16 expands at a greater rate and extent than ballast pipe 14. If all bracket connectors 30 are disposed in the same direction, then each tongue 40 would then shift slightly outward from slot 42 so that the last tongue 40 would slide out to a much greater extent than the first. However, by alternating the orientation of stop portions 64, the expansion of conduit 16 is accommodated by gaps 60 of bottom portion 32 so that no significant change occurs in the interconnection of bottom portion 32 and middle portion 34.

FIGS. 9 and 10 show the interconnection of top portion 36 and middle portion 34. Arms 44 and top portion 36 are symmetrical, so they may be connected from either direction. Top portion 36 may slide between arms 44, however, one of arms 44 must be moved slightly outwardly to accommodate the one protrusion 48 which extends outwardly where the corresponding arm 44 does not include channel 46. The other protrusion 48 is received by a corresponding channel 46 of the other arm 44. Once top portion 36 is positioned within arms 44, each channel 46 receives a corresponding protrusion 48 which in combination with central aperture 74 define a throughway receiving bolt 52.

Top portion 36, middle portion 34, and bottom portion 32 interconnect to form a body for bracket connector 30 which has a relatively smooth and even exterior surface which substantially eliminates locations for particulate accumulation which are not easily cleaned. Only hollow 76 exists between the back of protrusion 48 and arm 44, with hollow 76 being required for efficient casting of top portion 36. However, since hollow 76 is open to the exterior in a vertical plane, the chance of particulate accumulation is small. Also, it is possible to eliminate hollow 76 by using a camming action in the molding process which forms top portion 46. Further, indented recesses 78 located on the upper portion of top portion 36 are curved so that by spraying into each indented recess 78, any accumulated particulate will readily be washed out.

In accordance with a second embodiment of the present invention (FIGS. 11–14), unitary bracket connector 82 includes top portion 84 and arms 86 and 88, the arms interconnecting to secure together ballast pipe 14 and conduit 16. The lower sections of arms 86 and 88 extend over and around conduit 16 and include fingers 90 which engage saddle portion 38 of conduit 16. Arms 86 and 88 also include arcuate portions 92 and 94, respectively, which receive ballast pipe 14. Bolt 96 engages nut 98 to fasten together arms 86 and 88. Top potion 84 is integrally formed with arms 86 and 88, with the plastic material of bracket connector 82 allowing arms 86 and 88 to flex angularly from top portion 84.

Figure 13:
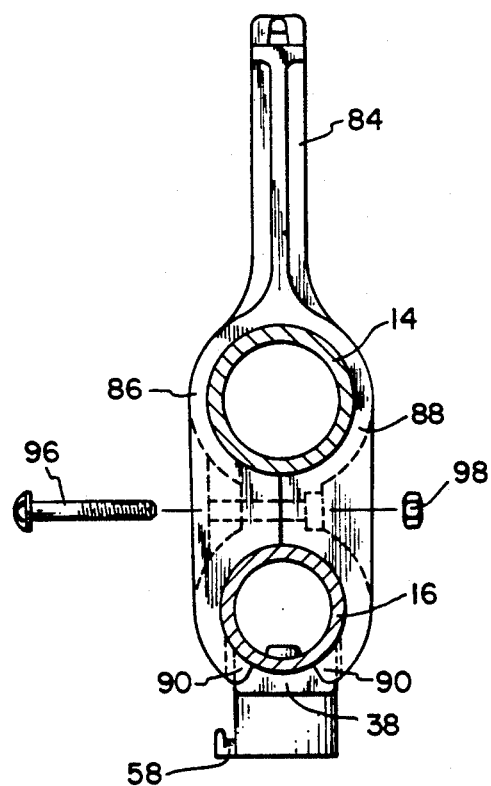
FIG. 13 is a sectional view of the bracket connector of the second embodiment attached to the ballast pipe and conduit of the water supply system.
Figure 14:
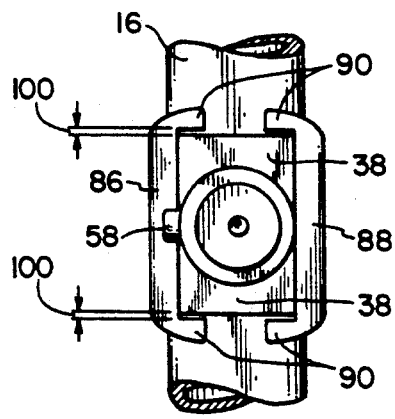
FIG. 14 is a bottom view of the conduit and the bracket connector of the second embodiment after attachment.

As shown in FIGS. 13 and 14, fingers 90 are keyed to the outer surface of vertical walls 54 of saddle portion 38. Fingers 90 are attached to conduit 16 by fitting over the side opposite saddle portions 38, and thus the recesses required to accommodate the extension of j-hook 58 is no longer needed in with the second embodiment. FIG. 14 particularly shows a small gap 100 in the axial direction between the lengths of saddle portion 38 and fingers 90 for allowing expansion and contraction of conduit 16 in the axial direction. Without gap 100, the fixed connection of ballast pipe 14 with bracket connector 82 may cause conduit 14 to bend and buckle in response to sudden temperature changes.

An advantageous feature of the second embodiment of the present invention involves its ease of installation and economical nature. The different portions of the bracket connector are integrally formed so that they do not need further assembly. The arms are simply flexed apart to receive and attach to the ballast pipe, and the water conduit is subsequently received with the fingers being keyed to the saddle portion of the conduit. Securing the arms together only requires tightening a bolt. Also, slightly less material is required to form the one piece bracket connector. Thus, the one piece bracket connector shown in FIGS. 11-14 may be easily installed in an animal water supply system, and this easy installation combined with lower material costs significantly reduces the expense of the water supply system.

Figure 12:
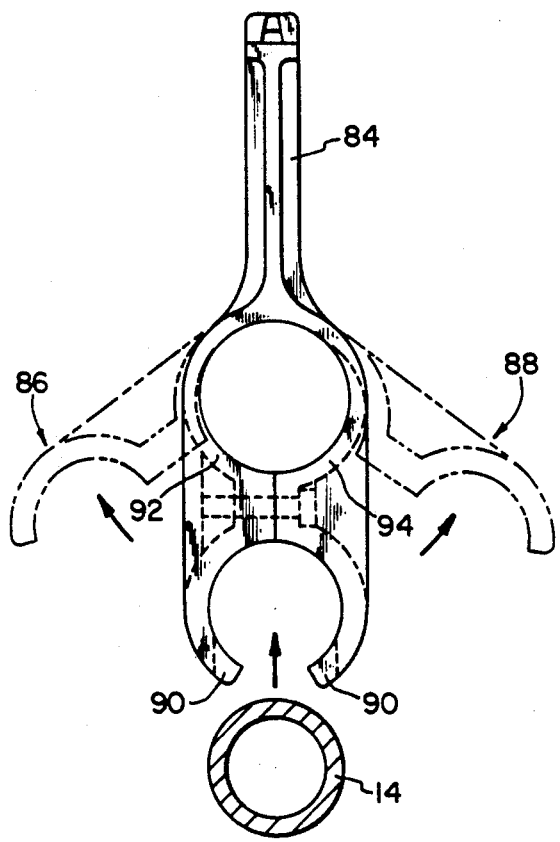
FIG. 12 is a sectional view of the ballast pipe and the bracket connector of the second embodiment, previous to attachment.

FIG. 12 illustrates arms 86 and 88 flexing angularly from the line defined by top portion 84 in order to receive ballast pipe 14. As shown in dotted lines, arms 86 and 88 may be momentarily spread apart to allow ballast pipe 14 to be inserted into arcuate portions 92 and 94. The interior surface of arcuate portions 92 and 94 may be smooth to slide over the exterior of ballast pipe 14. Alternatively, the interior surface of arcuate portions 92 and 94 may include ribs or other serrations. However, prior to interconnection by bolt 96 and nut 98, arms 86 and 88 are pliable so that any ribs or other serrations do not inhibit the sliding connection with ballast pipe 14.

In the preferred embodiment, the material which comprises bracket connector 30 or 82 may be a polyethylene, polypropylene, or other suitable material resistant to chemicals.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A suspended water supply system for chickens and small animals, said water supply system comprising:
   a conduit for transmitting water, said conduit including a plurality of saddle portions, each said saddle portion including an outer surface having a predetermined orientation relative to said conduit;
   a plurality of dispenser valves for selectively dispensing water from said conduit, each said dispenser valve disposed on one of said saddle portions;
   ballast means for supporting said conduit; and
   means for connecting said ballast means and said conduit, said connecting means including a ballast attachment portion disposed around said ballast means, said connecting means further including a saddle receiving portion disposed about said conduit and being keyed to said outer surface of said saddle portion, whereby said connecting means is keyed to said saddle portion of said conduit and aligns said dispenser valves with said ballast means so that when said water supply system is suspended, said dispenser valves are automatically positioned perpendicularly relative to the ground.

2. The water supply system of claim 1 wherein said connecting means includes an integral body having two arms securing together said ballast means and said conduit.

3. The water supply system of claim 2 wherein each of said arms includes a plurality of fingers, said fingers being keyed to said outer surface of said saddle portion.

4. The water supply system of claim 2 further comprising means for securing said arms together and thereby holding said conduit and said ballast means.

5. The water supply system of claim 1 wherein said saddle portion includes a protrusion, and said saddle receiving portion includes a recess for allowing said saddle receiving portion to be disposed over said conduit without interference from said protrusion.

6. The water supply system of claim 1 wherein said saddle receiving portion includes a tongue and said ballast attachment portion includes a slot receiving said tongue, said tongue and said slot interfitting across substantially all of the axial width of said connecting means.

7. The water supply system of claim 6 wherein said ballast attachment portion includes an angled shoulder partially defining said slot, said tongue includes a pointed flange, and said tongue flange and said slot shoulder interfit so that substantially all of said ballast attachment portion defining said slot abuts said tongue.

8. The water supply system of claim 6 wherein said saddle receiving portion defines a recess adjacent to said tongue, and said ballast attachment portion includes a nub extending into said recess whereby said nub latches said tongue within said slot.

9. The water supply system of claim 1 wherein said conduit is comprised of a first material adapted to contain drinking water, and said connecting means is comprised of a second material having a greater resistance to cleaning and disinfecting chemicals than said first material.

10. The water supply system of claim 1 wherein said saddle portion outer surface includes a pair of vertical walls, said saddle receiving portion being keyed to said vertical walls.

11. The water supply system of claim 1 wherein said saddle portions include a wall which defines said outer surface, and said saddle receiving portion defines an aperture adapted to receive said saddle portion, said saddle receiving portion closely fitting against said wall of said outer surface in a first direction.

12. The water supply system of claim 11 wherein said saddle receiving portion aperture includes a gap between said saddle portion and said saddle receiving portion in a second direction whereby said saddle portions may axially move in said second direction within said gap responsive to any expansion or contraction of said conduit.

13. The water supply system of claim 1 further including a plurality of said connecting means, wherein said saddle receiving portion includes a tongue, said ballast attachment portion includes a slot receiving said tongue and a stop portion at one end of said ballast attachment portion for limiting the position of said tongue in said slot, said plurality of connecting means having said stop portions alternately positioned across said conduit.

14. The water supply system of claim 1 wherein said connecting means includes a body having a substantially smooth exterior surface whereby the accumulation of particulate on said exterior surface is minimized.

15. The water supply system of claim 1 wherein said ballast attachment portion includes two arms adapted to open and receive said ballast means.

16. The water supply system of claim 15 wherein said connecting means further includes a top portion adapted to interfit between said arms.

17. The water supply system of claim 16 wherein said connecting means includes means for fastening said top portion within said arms and thereby secure said ballast means within said ballast attachment portion.

18. A suspended water supply system for chickens and small animals, said water supply system comprising:
a conduit for transmitting water, said conduit including a plurality of saddle portions;
a plurality of dispenser valves, each said dispenser valve disposed on one of said saddle portions;
ballast means for supporting said conduit; and
means for connecting said ballast means and said conduit, said connecting means including a removable saddle receiving portion disposed on said conduit over one of said saddle portions, said connecting means further including a removable ballast attachment portion connected to said saddle receiving portion and having two arms adapted to open and receive said ballast means, said connecting means further including a top portion adapted to interfit between said arms, said connecting means further including means for fastening said top portion within said arms and thereby secure said ballast means within said ballast attachment portion.

19. The water supply system of claim 18 wherein said fastening means includes a bolt extending through an aperture defined by said ballast attachment portion and said top portion.

20. The water supply system of claim 19 wherein said top portion includes protrusions and said ballast attachment portion includes channels which interfit to position said top portion within said arms and define said aperture.

21. The water supply system of claim 18 wherein said saddle receiving portion and said ballast attachment portion slidingly interfit.

22. The water supply system of claim 21 wherein said saddle receiving portion includes a tongue and said ballast attachment portion includes a slot receiving said tongue, said tongue and said slot interfitting across substantially all of the axial width of said connecting means.

23. The water supply system of claim 22 wherein said saddle receiving portion defines a recess adjacent to said tongue, and said ballast attachment portion includes a nub extending into said recess whereby said nub latches said tongue within said slot.

24. The water supply system of claim 18 wherein said top portion slidingly interfits within said arms.

25. The water supply system of claim 18 wherein said saddle portions include a wall and said saddle receiving portion is keyed to said wall whereby said dispenser valves are perpendicularly oriented to the ground.

* * * * *